United States Patent
Hong

(10) Patent No.: US 10,214,237 B2
(45) Date of Patent: Feb. 26, 2019

(54) DEVICE FOR DETERMINING STEERING WHEEL ROTATION INFORMATION AND METHOD FOR DETERMINING STEERING WHEEL ROTATION INFORMATION

(71) Applicant: Robert Bosch GmbH, Stuttgart (DE)

(72) Inventor: Zhichao Hong, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 72 days.

(21) Appl. No.: 15/392,067

(22) Filed: Dec. 28, 2016

(65) Prior Publication Data

US 2017/0190359 A1   Jul. 6, 2017

(30) Foreign Application Priority Data

Dec. 31, 2015  (CN) .......................... 2015 1 1030676

(51) Int. Cl.
  *B62D 15/02*   (2006.01)
  *B62D 3/12*    (2006.01)
  *B62D 5/00*    (2006.01)

(52) U.S. Cl.
  CPC ......... *B62D 15/0225* (2013.01); *B62D 3/126* (2013.01); *B62D 5/00* (2013.01)

(58) Field of Classification Search
  CPC ....... B62D 15/0225; B62D 3/126; B62D 5/00
  See application file for complete search history.

(56) References Cited

U.S. PATENT DOCUMENTS

| | | | | |
|---|---|---|---|---|
| 4,448,088 | A  * | 5/1984 | Adams ................... | B62D 3/123 74/422 |
| 9,975,056 | B2 * | 5/2018 | Kawamura ............ | A63H 30/04 |
| 2002/0096388 | A1 * | 7/2002 | Fujiwara ................ | B62D 5/008 180/444 |
| 2003/0146041 | A1 * | 8/2003 | Kanda ................... | B60T 8/1755 180/446 |
| 2005/0016789 | A1 * | 1/2005 | Asada ..................... | B62D 15/02 180/444 |
| 2010/0106375 | A1 * | 4/2010 | Ahmed ................... | B62D 3/12 701/42 |
| 2014/0045634 | A1 * | 2/2014 | Hong .................... | B62D 5/0409 475/4 |
| 2014/0116167 | A1 * | 5/2014 | Aizawa ................ | F16B 21/183 74/89.17 |
| 2014/0353073 | A1 * | 12/2014 | Banno .................. | B62D 5/0481 180/446 |
| 2016/0221601 | A1 * | 8/2016 | Barthomeuf ......... | B62D 5/0469 |

* cited by examiner

*Primary Examiner* — Calvin Cheung
(74) *Attorney, Agent, or Firm* — Michael Best & Friedrich LLP

(57) ABSTRACT

A device for determining steering wheel rotation information, which comprises a linear motion transforming element connected to a steering column of a steering wheel for transforming rotation of the steering wheel into a linear movement, and a processing element electrically connected to the linear motion transforming element for determining steering wheel rotation information based on the linear movement transformed by the motion transforming element.

18 Claims, 7 Drawing Sheets

DEVICE FOR DETERMINING STEERING WHEEL ROTATION INFORMATION AND METHOD FOR DETERMINING STEERING WHEEL ROTATION INFORMATION

BACKGROUND OF THE INVENTION

The present invention relates to automotive technology, in particular to a technology for determining information about steering wheel rotation.

A steering wheel rotation angle sensor is a component of a vehicle stability control system, which is usually mounted in a steering column under a steering wheel for measuring a rotation angle of the steering wheel during automotive steering.

Steering wheel sensors are mostly designed on the basis of Giant Magneto Resistive (GMR). To put it simple, after steering of the steering wheel, a rotor formed by an N-pole and an S-pole rotates under the action of a gear, and a GMR is provided inside the rotor for detecting a magnetic field direction from the N-pole to the S-pole. Moreover, a magnetic sensor is provided for detecting waveforms whose phases are staggered by 90 degrees and calculating a steering angle by means of the two waveforms. A GMR-based direction sensor includes many components and a high precision is required for the gear used therein.

SUMMARY OF THE INVENTION

In view of the above, the present invention provides a device for determining steering wheel rotation information, which may comprise: a linear motion transforming element connected to a steering column of a steering wheel for transforming rotation of the steering wheel into a linear movement; and a processing element electrically connected to the motion transforming element for determining the steering wheel rotation information based on the linear movement transformed by the motion transforming element.

According to an example of the device for determining steering wheel rotation information of the present invention, the linear motion transforming element comprises a gear connected to the steering column; a rack engaged with the gear, wherein the steering column is driven to rotate by the steering wheel to make the gear connected to said steering column rotate, and rotation of the gear drives the rack engaged therewith to move relative to an engagement origin along a rack length direction; a rack carrier for carrying the rack, said rack being disposed on said rack carrier in a manner to enable movement along its length direction; a processing element which determines a steering wheel rotation angle based on a distance of movement and a direction of movement of the rack relative to the engagement origin along the rack length direction, said engagement origin being a position of engagement between the rack and the gear when the rotation angle of the steering wheel is 0 degree.

According to an example of the device for determining steering wheel rotation information of the present invention, the processing element may comprise: a sensing unit for sensing a distance of movement and a direction of movement of the rack relative to the engagement origin; a calculating unit electrically connected to the sensing unit for determining, according to the result of sensing of the sensing unit, the distance of movement and the direction of movement, and determining the steering wheel rotation angle thereby.

According to an example of the device for determining steering wheel rotation information of the present invention, the sensing unit may comprise an elastic element whose elastic end is connected to the rack in a manner of expanding and contracting with the movement of the rack, and a pressure sensor which is combined with the elastic element in a manner of being able to sense an elastic force of the elastic element.

According to an example of the device for determining steering wheel rotation information of the present invention, the calculating unit is electrically connected to the pressure sensor, the pressure sensor senses a force generated by the elastic element owing to an expansion or an extraction, and conveys a signal representing said force to the calculating unit, and the calculating unit determines, according to said force, the distance of movement and the direction of movement of the rack relative to the engagement origin.

According to an example of the device for determining steering wheel rotation information of the present invention, the sensing unit comprises a measuring gear engaged with the rack; a gear rotation sensing element for sensing a number and a direction of rotation of the measuring gear caused by movement of the rack.

According to an example of the device for determining steering wheel rotation information of the present invention, the calculating unit determines a distance of movement and a direction of movement of the rack relative to the engagement origin along the rack length direction according to the rotation number and rotation direction of the gear.

According to an example of the device for determining steering wheel rotation information of the present invention, the sensing unit is a slide rheostat, whose coil assembly or slider is fixed on the device for determining steering wheel rotation information, when the coil assembly is fixed on the device for determining steering wheel rotation information, the slider is connected to the rack and movement of the rack drives the slider to move; when the slider is fixed on the device for determining steering wheel rotation information, the coil assembly is connected to the rack, and movement of the rack drives the coil assembly to move.

According to an example of the device for determining steering wheel rotation information of the present invention, the calculating unit determines a distance of movement and a direction of movement of the rack relative to the engagement origin along the rack length direction according to an output of the slide rheostat.

According to an example of the device for determining steering wheel rotation information of the present invention, the sensing unit is a capacitive grating displacement sensor, which comprises a scale arranged to be fixed, a slide scale connected to the rack in such a manner as to move along with the rack as the rack moves, a transmission pole piece disposed on the scale, a receiving pole piece disposed on the slide scale, wherein the transmission pole piece and the receiving pole piece form a capacitor, and when the slide scale is driven to move by the rack, the transmission pole and the receiving pole piece move relative to each other so that a capacitance therebetween changes.

According to an example of the device for determining steering wheel rotation information of the present invention, the calculating unit determines a distance of movement and a direction of movement of the rack relative to the engagement origin along the rack length direction according to the change of capacitance.

According to an example of the device for determining steering wheel rotation information of the present invention, the sensing unit is a grating displacement sensor which comprises a first grating arranged to be fixed; a second grating connected to the rack in a manner of moving as the rack moves; a light source; and a light sensitive element, wherein the first grating and the second grating are disposed between the light source and the light sensitive element, and the light source and the light sensitive element move together with the second grating when the second grating moves.

According to an example of the device for determining steering wheel rotation information of the present invention, the calculating unit determines a distance of movement and a direction of movement of the rack relative to the engagement origin along the rack length direction according to an output of the light sensitive element.

According to an example of the device for determining steering wheel rotation information of the present invention, the sensing unit comprises: a Hall sensing element disposed in said device for determining steering wheel rotation information in a fixed manner, and a Hall scale connected to the rack so as to move when the rack moves.

According to an example of the device for determining steering wheel rotation information of the present invention, the calculating unit determines a distance of movement and a direction of movement of the rack relative to the engagement origin along the rack length direction according to a change of magnetic field caused by movement of the Hall scale relative to the Hall sensing element.

According to an example of the device for determining steering wheel rotation information of the present invention, the gear is connected to the steering column through an intermediate shaft, and the intermediate shaft is connected to the steering column through a universal joint.

According to another example of the present invention, in the device for determining steering wheel rotation information, the linear motion transforming element consists of a turbine and a worm.

According to another aspect of the present invention, a method for determining steering wheel rotation information is provided, which comprises: a) providing a linear motion transforming element at an end of the steering column that is not connected to the steering wheel so as to transform rotation of the steering wheel into a linear movement; and b) determining steering wheel rotation information based on the linear movement transformed by the motion transforming element.

In the method for determining steering wheel rotation information according to an example of the present invention, step a) comprises providing a gear at an end of the steering column that is not connected to the steering wheel; providing a rack engaged with the gear, wherein the steering column is driven to rotate by the steering wheel to make the gear connected to said steering column rotate, and rotation of the gear drives the rack engaged therewith to move relative to the engagement origin along a rack length direction; and step b) comprises: determining steering wheel rotation information based on a distance of movement and a direction of movement of the rack relative to the engagement origin along the rack length direction, said engagement origin being a position of engagement between the rack and the gear when the rotation angle of the steering wheel is 0 degree.

According to still another aspect of the present invention, an automobile comprising any of the above-mentioned devices for determining steering wheel rotation information is provided. According to an example of the present invention, an automobile for carrying out the above-mentioned method for determining steering wheel rotation information is also provided.

DETAILED DESCRIPTION

Figure 1:
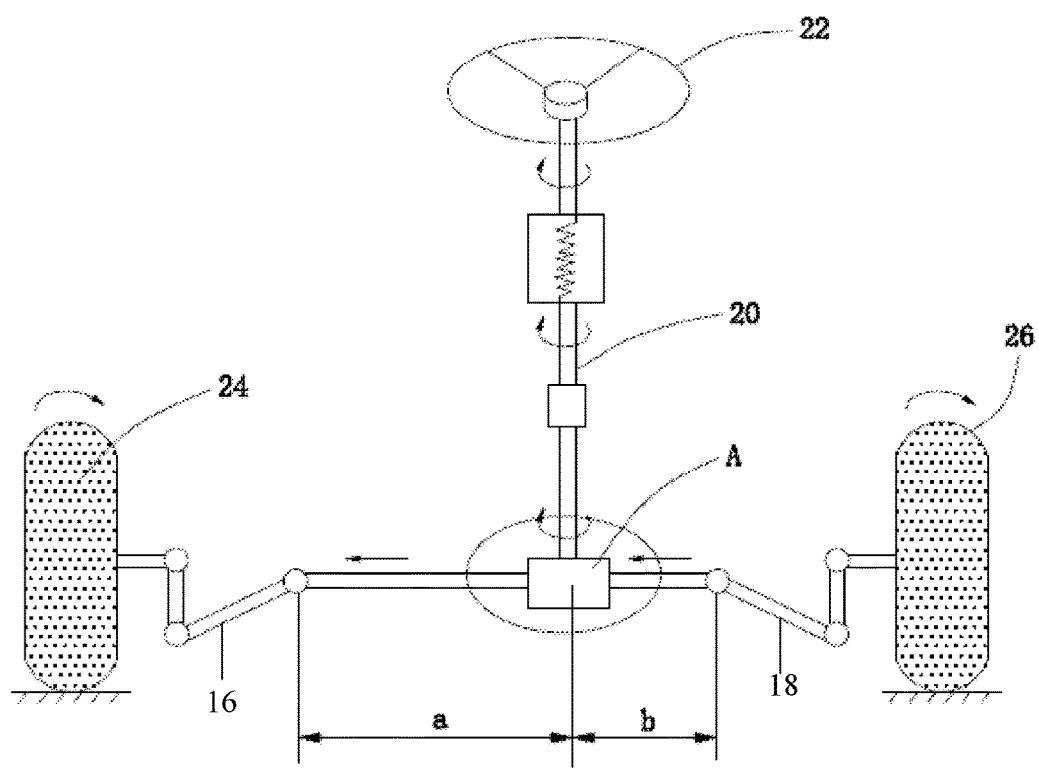
FIG. 1 is a schematic drawing of a structure of the device for determining steering wheel rotation information according to one embodiment of the present invention.

Schematic examples of the present invention are described below with reference to the figures, wherein the same reference numerals indicate the same elements. The embodiments described in the text below can help those skilled in the art to have a thorough understanding of the present invention, and they intend to exemplify rather than limiting. The graphs of respective elements, components, modules, devices and means are not necessarily drawn to scale, but they only schematically show the relative relationship among said elements, components, modules, devices and means.

A device for determining steering wheel rotation information according to one embodiment of the present invention comprises: a linear motion transforming element connected to a steering column of a steering wheel for transforming rotation of the steering wheel into a linear movement; and a processing element electrically connected to the motion transforming element for determining the steering wheel rotation information based on the linear movement transformed by the motion transforming element. Said linear motion transforming element may be formed, for example, by a turbine and a worm. The steering column rides a steering rod, a steering column pole, etc. in practical application.

Figure 2:
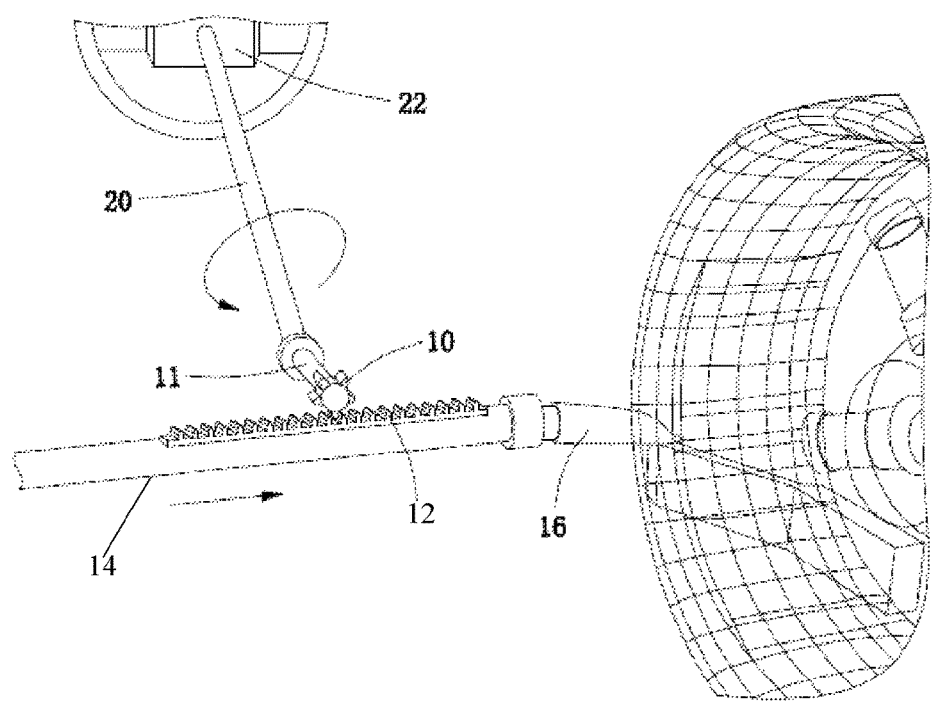
FIG. 2 is a schematic drawing the device for determining steering wheel rotation information as shown in FIG. 1 viewing in another angle, wherein a structure of part A of FIG. 1 is shown.

FIG. 1 is a schematic drawing of a structure of the device for determining steering wheel rotation information according to one embodiment of the present invention; FIG. 2 is a schematic drawing the device for determining steering wheel rotation information as shown in FIG. 1 viewing in another angle, wherein a structure of part A of FIG. 1 is shown.

Referring to both FIG. 1 and FIG. 2, the device for determining steering wheel rotation information comprises a gear 10, a rack 12, a rack carrier 14 and a processing element (not shown). The gear 10 is connected to a steering column 20, and the gear 10 is driven to rotate by the rotation of the steering column 20. The rack carrier 14 carries the rack 12, and the rack 12 is disposed on the rack carrier 14 in a manner of being movable along a direction of its length. The gear 10 is engaged with the rack 12, so that rotation of the gear 10 drives the rack 12 to move along its length direction.

According to one example of the present invention, the rack carrier 14 is a rod-shaped element, in which a slide groove is provided at a position for engagement with the rack 12, so that the rack 12 can move in said slide groove. According to another example of the present invention, the rack carrier 14 includes two sleeve joints sheathed to each other, wherein an inner sleeve joint is fixed while an outer sleeve joint sheathed outside of the inner sleeve joint can move along said inner sleeve joint, and the rack 12 is fixed on the outer sleeve joint and the outer sleeve joint is arranged to be shorter than the inner sleeve joint. As an example, the outer sleeve joint and the inner sleeve joint are, for example, ring-shaped members sheathed to each other. The rack carrier 14 can be formed in various ways and it can carry the rack 12 in various ways. In general, the construction of the rack carrier 14 as well as the way of joining the rack carrier 14 and the rack 12 are not limited to those listed herein, as long as they can enable the rack 12 to move along its length direction when driven by the gear 10.

Those skilled in the art know that rotation of the steering wheel should be delivered to the wheels. According to one example of the present invention, rotation of a steering wheel 22 is delivered to a first tie rod 16 and a second tie rod 18 via the steering column 20, the gear 10 and the rack 12. It shall be understood that the first tie rod 16 and the second tie rod 18 are components respectively arranged at the wheels and gears on both sides, and the first tie rod 16 and the second tie rod 18 are respectively connected to the rack 12 and the corresponding wheel in a manner of being able to further delivering to the wheels the steering wheel rotation delivered by the gear 10 and the rack 12. To be specific, the first tie rod 16 is arranged between the rack 12 and a wheel 24 (in a direction facing the view, said wheel is on the left, so it is called the left wheel 24 hereinafter), and it is connected to the rack 12 and the wheel 24 in a manner of being able to deliver movement of the rack 12 to the wheel 24; the second tie rod 18 is arranged between the rack 12 and a wheel 26 (in a direction facing the view, said wheel is on the right, so it is called the right wheel 26 hereinafter), and it is connected to the rack 12 and the wheel 26 in a manner of being able to deliver movement of the rack 12 to the wheel 26.

Demonstratively rather than restrictively, the gear 10 is connected to the steering column 20 through an intermediate shaft 11, one end of the intermediate shaft 11 being connected to the steering column 20 through a universal joint, and the other end thereof being used for fixing the gear 10, as shown in FIG. 2. The steering column 20 drives the intermediate shaft 11 to rotate, and the intermediate shaft in turn drives the gear 10 to rotate.

Demonstratively rather than restrictively, the gear 10 is connected to the steering column 20 through an intermediate shaft 11, one end of the intermediate shaft 11 being a gear-shaped structure 10 so as to be engaged with the rack 12, while the other end of the intermediate shaft 11 is connected to the steering column 20 through a universal joint.

In an example of the present invention, the engagement origin refers to a position of engagement between the gear 10 and the rack 12 when the steering wheel is at 0 degree.

According to a non-restrictive specific example of the present invention, the engagement origin divides the rack 12 into two parts, a first sub-part of the rack 12 which is connected to the first tie rod 16 has a length a, and a second sub-part of the rack 12 which is connected to the second tie rod 18 has a length b. In this example, when the gear and the rack engage at the engagement origin, a equals to b. Referring to FIG. 1, the steering wheel 22 rotates clockwise, which drives the steering column 20 to rotate clockwise. The steering column 20 then drives the gear 10 to rotate clockwise, and the gear 10 drives the rack 12 so that the rack 12 moves towards the left wheel 24 along its length direction, in this case, the length a of the first sub-part and the length b of the second sub-part both change, and a difference therebetween is the distance of movement of the rack 12. According to the following equations (1) and (2), an angular velocity ω of the steering column 20 can be determined and a rotation angle of the steering wheel can be determined:

$$x = a - b \quad (1)$$

$$x = \int v\,dt = \int f(\omega) \cdot r\,dt \quad (2)$$

wherein, x is a displacement of rack 12, ω is an angular velocity of the steering column 20, an angular velocity of the intermediate shaft 11 is a function of ω, i.e. f(ω), and r is a pitch diameter of gear 10.

As an alternative, when the gear and the rack engage at the engagement origin, a may not be equal to b, in this case, when the rack 12 moves because of rotation of the steering wheel 22, the difference between a and b also changes, and said change of the difference can reflect the distance of movement of the rack 12.

According to an example of the present invention, the processing element of the device for determining steering wheel rotation information includes a sensing unit and a calculating unit. The sensing unit is for sensing movement of the rack relative to the engagement origin; and the calculating unit is electrically connected to the sensing unit for determining, according to the result of sensing of the sensing unit, the distance of movement and the direction of movement of the rack relative to the engagement origin along the rack length direction, and accordingly determining the steering wheel rotation information according to the relationship reflected by equations (1) and (2). In the examples of the present invention, the steering wheel rotation information includes, for example, a rotation angle of the steering wheel, a rotation direction of the steering wheel, and a rotation speed of the steering wheel. Although the examples of the present invention do not specifically describe the process of determining the rotation speed of the steering wheel, those skilled in the art can sure understand that the rotation speed of the steering wheel can be determined according to the angle and time of rotation of the steering wheel.

Figure 3:
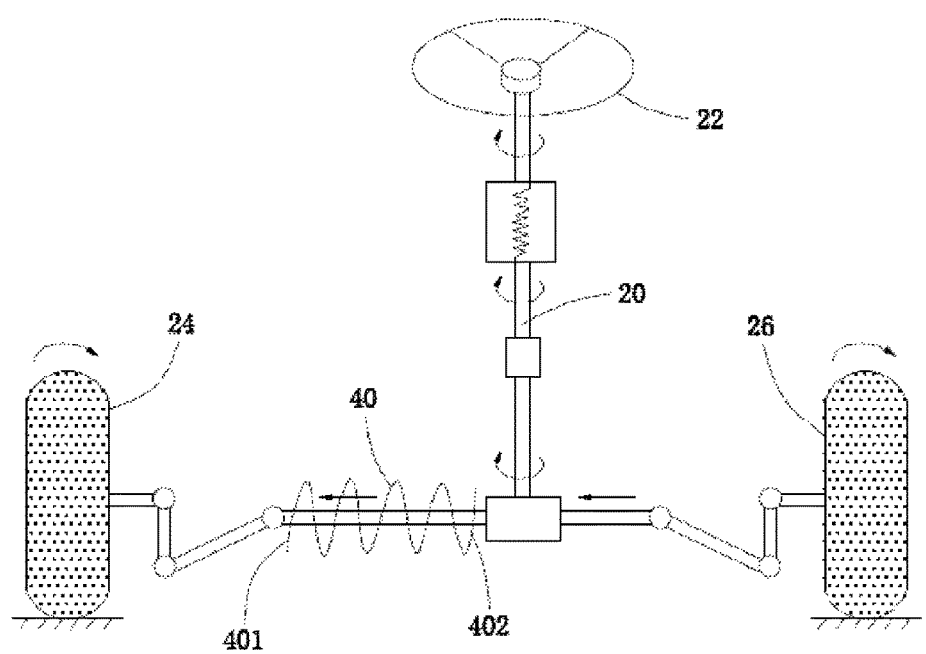
FIG. 3 is a schematic drawing of a structure of the device for determining steering wheel rotation information according to one specific example of the present invention.

FIG. 3 is a schematic drawing of a structure of the device for determining steering wheel rotation information according to one specific example of the present invention. In this example, the sensing unit is an elastic element 40. A fixed end of the elastic element 40, i.e. a first end 401 in this example, is fixed on a suitable element in the interior structure of the vehicle, and a second end 402 expands and contracts with the movement of the rack 12 (see FIG. 2) relative to the engagement origin, said expansion and contraction representing the distance and direction of movement of the rack 12 relative to the engagement origin. In this example, when the elastic element 40 is compressed, it means that the steering wheel rotates clockwise, otherwise, the steering wheel rotates counter-clockwise. In the example shown in FIG. 3, the first end 401 of the elastic element 40 is, for example, fixed on the rack carrier 14 (see FIG. 2). Alternatively, the first end 401 of the elastic element 40 can be fixed on other fixed elements in the vehicle which are suitable for fixing the elastic element 40. The word "suitable" herein intends to mean that said element for fixing the elastic element 40 is positioned in the vehicle in such a manner that it can enable normal operation of the elastic element 40 after being fixed thereon. In practical application, the element for fixing the first end 401 is preferably close to the rack 12 or the rack carrier 14.

In the example of FIG. 3, the displacement x of the rack 12 can be determined by equation (3):

$$F=kx_1 \quad (3)$$

wherein, F is an elastic force of the elastic element, k is an elastic factor, $x_1$ is a displacement of the second end 401 of the elastic element. In this example, the displacement of the second end 402 is just the distance x of movement of the rack 12. F can be obtained by a pressure sensor, etc., wherein the pressure sensor is combined with the elastic element in a manner of being able to sense the elastic force of the elastic element, for example, it is mounted at the first end 401.

In the example of FIG. 3, the elastic element is, for example, a spring.

Figure 4:
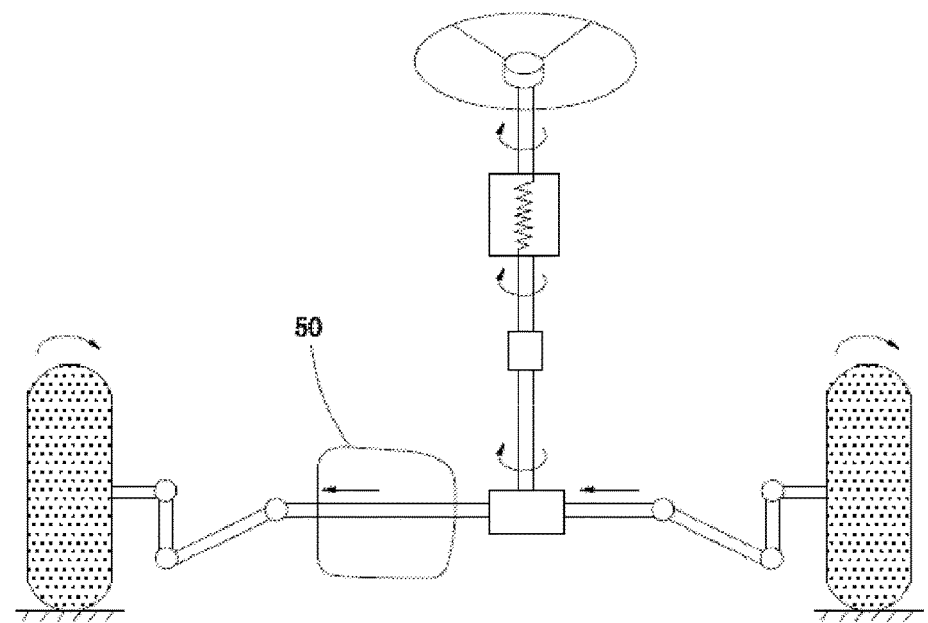
FIG. 4 is a schematic drawing of a structure of the device for determining steering wheel rotation information according to another specific example of the present invention.
Figure 5:
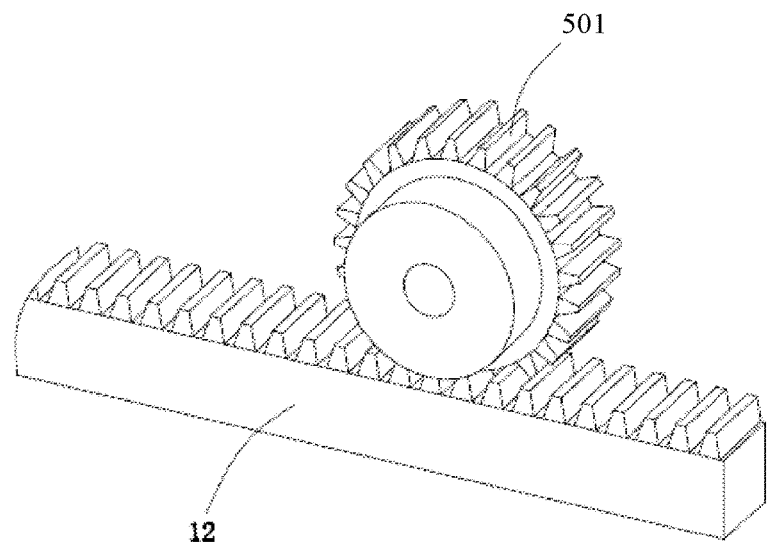
FIG. 5 is a schematic drawing of engagement between a measuring gear 501 and a rack 12 according to an example of the present invention.

FIG. 4 is a schematic drawing of a structure of the device for determining steering wheel rotation information according to another specific example of the present invention. In this example, the sensing unit 50 comprises a measuring gear 501 and a gear rotation sensing member (not shown). As shown in FIG. 5, the measuring gear 501 is engaged with the rack 12 (see FIG. 2), so that movement of the rack 12 drives rotation of the measuring gear 501. The measuring gear 501 can be fixed on the vehicle by a fixing member, wherein said measuring gear 501 can rotate about the fixing member. As an example, the fixing member is fixed on, for example, the rack carrier 14 (see FIG. 2). The gear rotation sensing member is, for example, a Hall sensor, which measures the rotation angle and rotation speed of the gear 501 and transmits measurement signals to the calculating unit. The calculating unit determines a distance of movement and a direction of movement of the rack relative to the engagement origin along the rack length direction accordingly. The measuring gear 501 and the gear 10 may have the same or different sizes. Alternatively, an additional rack may be provided for engaging with the sensing unit 50, and said additional rack may also be provided on the rack carrier 14 and connected to the rack 12, so that said additional rack can move with the rack 12.

Figure 6:
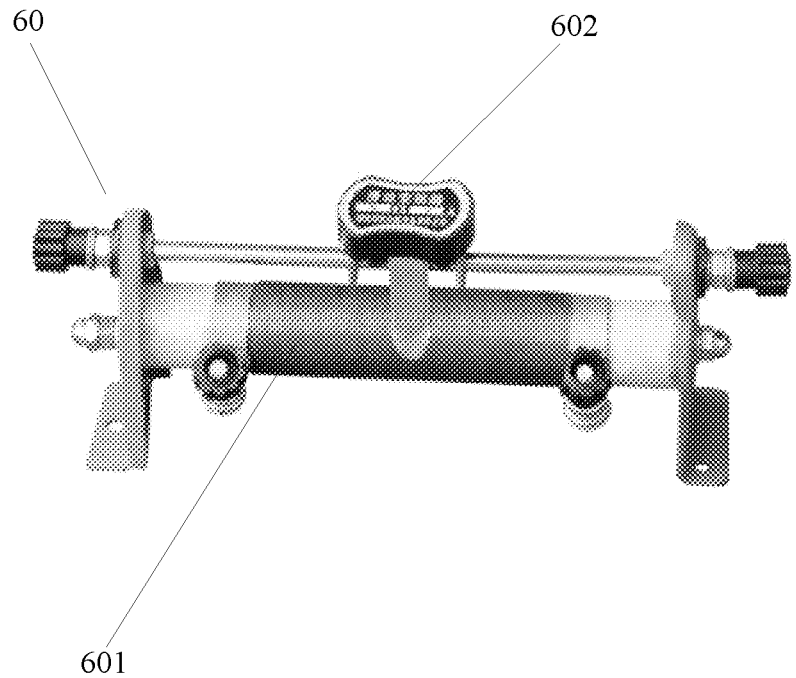
FIG. 6 is a schematic drawing of a slide rheostat according to an example of the present invention.

In the device for determining steering wheel rotation information according to another specific example of the present invention, the sensing unit is a slide rheostat. FIG. 6 is a schematic drawing of the slide rheostat. Compared to the example shown in FIG. 4, said example of the device for determining steering wheel rotation information mainly differs by the sensing unit, so said example is described with reference to FIGS. 4 and 6. A slide rheostat 60 that serves as the sensing unit has a coil assembly 601 fixed in the vehicle, for example, fixed on the rack carrier 14 (see FIG. 2) or on other suitable elements in the vehicle. A slider 602 is connected to the rack 12 in such a manner as to enable the slider 602 to move along with the rack 12 (see FIG. 2) as the rack 12 moves. Alternatively, the slider 602 is fixed on the rack carrier 14 or on other suitable elements in the vehicle, while the coil assembly 601 is connected to the rack 12 in such a manner as to enable the coil assembly 601 to move along with the rack 12 as the rack 12 moves. As is known, there is a linear relationship between the changes of the displacement x of the slider 602 and the resistance of the coil assembly 601 (the resistance of the whole coil assembly 601 being R), and the linear coefficient is k. In this example, when the rack 12 moves a distance of x towards the left wheel 24, then the resistance of the coil assembly 601 reduces by kx, and an output voltage is V−kx, wherein V is an output voltage when the rack 12 and the gear 10 engage at the engagement origin, k is the coefficient; when the rack 12 moves a distance of x towards the right wheel 26, then the resistance of the coil assembly 601 increases by kx, and an output voltage is V+kx. According to the above-described relationship between the displacement and the voltage, as long as the voltage signal of the slide resistor is monitored, the magnitude and direction of displacement of the rack 12 can be determined. According to the present invention, the voltage output signal of the slide resistor is transmitted to the calculating unit, which in turn determines the distance and direction of movement of the rack 12 relative to the engagement origin according to the above-described relationship.

Figure 7A:
FIG. 7A is a schematic drawing of a capacitive grating displacement sensor according to an example of the present invention.
Figure 7B:
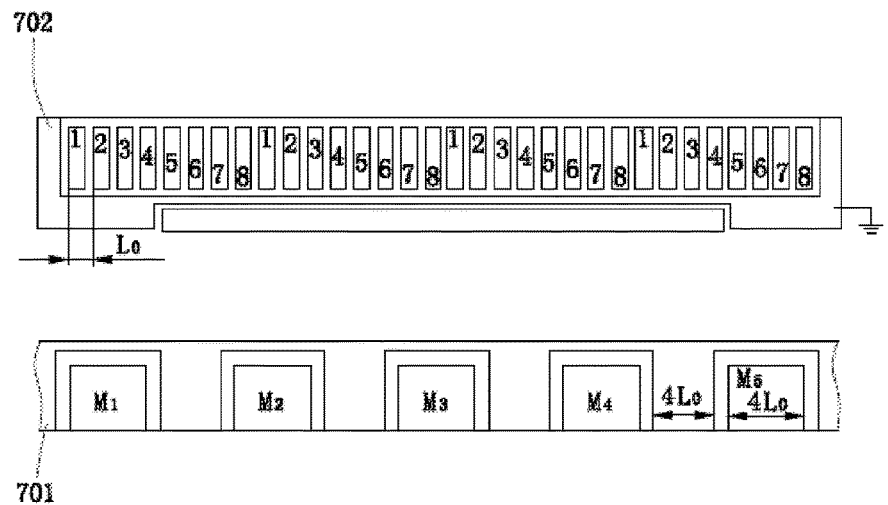
FIG. 7B is a schematic drawing of a structure of a capacitive grating displacement sensor 70 according to an example of the present invention.

In the device for determining steering wheel rotation information according to still another specific example of the present invention, the sensing unit is a capacitive grating displacement sensor. As shown in FIG. 7A, the general construction of said capacitive grating displacement sensor 70 is similar to a vernier caliper. FIG. 7B is a schematic drawing of a structure of the capacitive grating displacement sensor 70. Said capacitive grating displacement sensor 70 comprises a scale 70, a slide scale 702, a transmission pole piece disposed on the scale 701, a receiving pole piece disposed on the slide scale 702. The scale 701 is fixed in the vehicle, for example, fixed on the rack carrier 14 (see FIG. 2) or on other suitable elements in the vehicle. The slide scale 702 is connected to the rack 12 (see FIG. 2) in such a manner as to enable the slide scale 702 to move along with the rack 12 as the rack 12 moves. When the slide scale 702 moves, the transmission pole piece and the receiving pole piece move relative to each other, so that a capacitance therebetween changes. In this specific example, the transmission pole piece includes a first group of transmission pole pieces E consisting of altogether 8 pole pieces number as 1, 2, 3, 4, 5, 6, 7 and 8, and a second group of transmission pole pieces, a third group of transmission pole pieces and a fourth group of transmission pole pieces, which are similar to the first group of transmission pole pieces E. As an example, each pole piece has a width of $L_0$, and the transmission pole pieces with different numbers can excite different voltage values. The scale 701 comprises four receiving pole pieces M1, M2, M3 and M4, each receiving pole piece being insulated and shielded from other pole pieces, and the width of each receiving pole piece is $4L_0$. In this example, the space between the receiving pole pieces is also $4L_0$. The transmission pole pieces and the receiving pole pieces form capacitors, since the distance between the pole pieces is certain, the value of capacitance is directly proportional to the area it faces, and because the transmission pole pieces excite different voltage values, the change of the value of the capacitance is also relevant to the transmission pole piece, and the increase or decrease of the value of the capacitance can also reflect the direction of movement of the slide scale 702 relative to the scale 701. When the slide scale 702 moves to any position relative to the scale 701, there will always be some transmission pole pieces that face the receiving pole pieces (outputting signals), and there are also some transmission pieces that face a shielded area (i.e. being shielded and not outputting signals). The slide scale 702 moving relative to the scale 701 is equivalent to changing of the area that the capacitance faces, thus it results in a capacitance change, and the speed and trip of the slide scale 702 can be determined according to the capacitance value. The signal representing the capacitance change is transmitted to the calculating unit, which accordingly determines the distance of movement andthe direction of movement of the rack relative to the engagement origin along the rack length direction.

Figure 8:
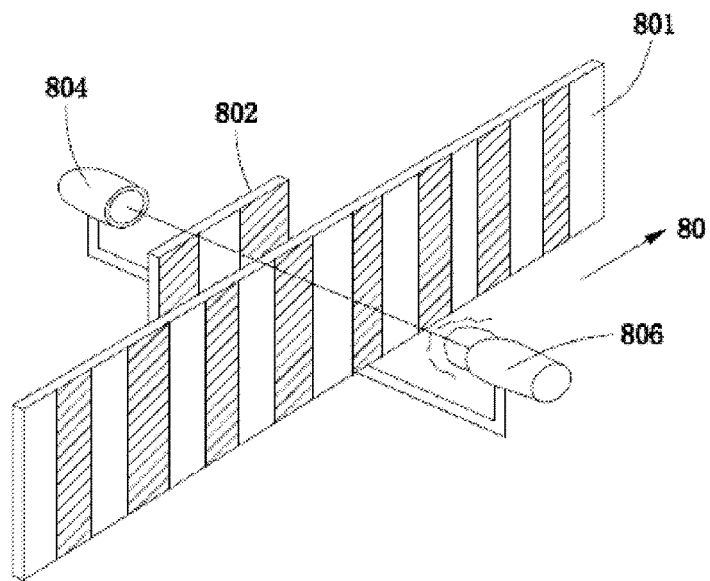
FIG. 8 is a schematic drawing of a grating displacement sensor 80 according to an example of the present invention.
Figure 9:
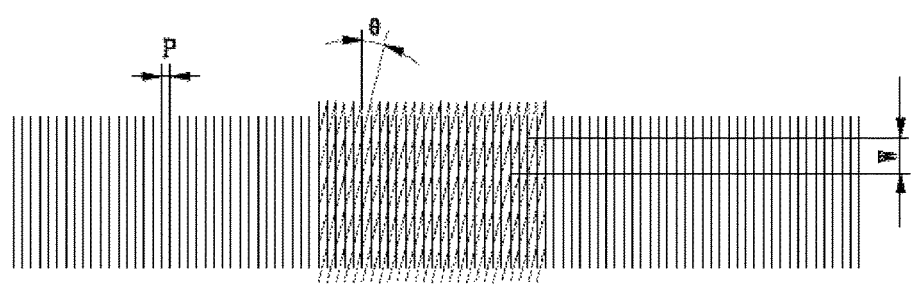
FIG. 9 is a schematic drawing of a grating pitch and a Moire fringe of the grating displacement sensor 80 according to an example of the present invention.

In the device for determining steering wheel rotation information according to yet another specific example of the present invention, the sensing unit is a grating displacement sensor. As shown in FIG. 8, a grating displacement sensor 80 comprises a first grating 801, a second grating 802, a light source 804, and a light sensitive element 806. The first grating 801 is fixed in said device for determining steering wheel rotation information, for example on the rack carrier 14 (see FIG. 2). The second grating 802 is connected to the rack 12 (see FIG. 2) so as to move along with the rack 12. There are small angles between grating bars of the first grating 801 and grating bars of the second grating 802, and sizes of the angles depend on the wavelength of the light emitted by the light source 804. The first grating 801 and the second grating 802 are disposed between the light source 804 and the light sensitive element 806, and the light source 804 and the light sensitive element 806 move along with the second grating 802 as the second grating 802 moves. As shown in FIG. 9, when the two gratings move relatively by a grating pitch P, the Moire fringe moves by a distance W. When the grating moves backward, the Moire fringe also moves backward. By means of such a correspondence, according to the number of fringes received by the light sensitive element 806, the value of displacement of the second grating 802 can be obtained. The light sensitive element 806 in the grating displacement sensor 8 outputs a signal that can represent the number of fringes, which is transmitted to the calculating unit. The grating bars of the second grating 802 can be made to have different sizes, so that the intensities of light sensed by the light sensitive element 806 vary with the specific grating bars, thereby reflecting the direction of movement of the second grating 802. The calculating unit determines the distance of movement and the direction of movement of the rack relative to the engagement origin along the rack length direction according to the output of the light sensitive element 806.

Figure 10:
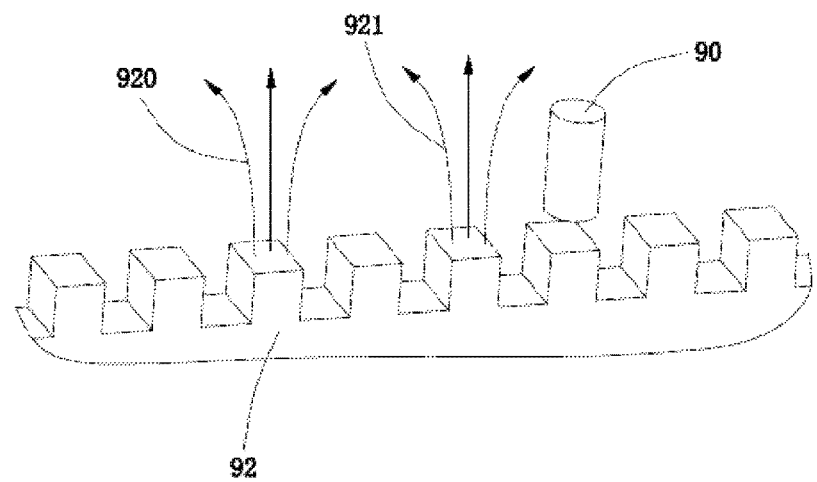
FIG. 10 is a schematic drawing of a sensing unit comprising a Hall sensing element 90 and a Hall scale 92 according to an example of the present invention.

In the device for determining steering wheel rotation information according to still another specific example of the present invention, the sensing unit, the sensing unit comprises a Hall sensing element 90 and a Hall scale 92, as shown in FIG. 10. The Hall sensing element 90 is fixed in the vehicle, for example, on the rack carrier 14 (see FIG. 2) or on other elements in the vehicle suitable for fixing the Hall sensing element 90. The Hall scale 92 is connected to the rack 12 (see FIG. 2) in such a manner as to enable the Hall scale 92 to move along with the rack 12 as the rack 12 moves. Each projection of the Hall scale 92 is a magnetic pole, and the magnetic induction lines 920 and 921 of two magnetic poles are schematically drawn in the figure. As the Hall scale 92 moves, the magnitude of the magnetic field sensed by Hall sensing element 90 changes constantly because of the change in the distance from the magnetic poles. Thus the linear movement of the Hall scale 92, i.e. the linear movement of the rack 12, is transformed into a change of the magnetic field and then into a current to be output. The signal representing the output current is transmitted to the calculating unit, which in turn calculates the magnitude of displacement using said signal based on the Hall principle and determines the direction of movement of the rack.

The present invention also provides a method for determining steering wheel rotation information. According to said method, a linear motion transforming element can be provided at an end of the steering column that is not connected to the steering wheel so as to transform rotation of the steering wheel into a linear movement; and the steering wheel rotation information can be determined based on the linear movement transformed by the motion transforming element.

In the method for determining steering wheel rotation information according to one embodiment of the present invention, a gear can be provided at an end of the steering column that is not connected to the steering wheel, such as the gear 10 connected to the steering column 20 in the examples described in the above text. Teeth engaged with the gear are provided, wherein the steering column is driven to move by the steering wheel so as to make the gear connected to said steering column rotate, and the rotation of the gear enables the rack engaged therewith to move relative to the engagement origin along the rack length direction; said rack is, for example, the rack 12 in the examples described in the above text. The steering wheel rotation information is determined based on the distance of movement and the direction of movement of the rack relative to the engagement origin along the rack length direction, said engagement origin being a position of engagement between the rack and the gear when the rotation angle of the steering wheel is 0 degree. As for details for carrying out said step, reference can be made to the examples given in the above text for describing the device for determining steering wheel rotation information. Wherein, as mentioned previously, the steering wheel rotation information includes a rotation angle of the steering wheel, a rotation direction of the steering wheel, and a rotation speed of the steering wheel.

According to the present invention, there is also provided a vehicle comprising said device for determining steering wheel rotation information or a vehicle for carrying out said method for determining steering wheel rotation information.

As described in the above in conjunction with the example, the device for determining steering wheel rotation information according to the examples of the present invention has a simpler structure, requires less components and can be easily realized. Compared to the conventional GMR-based direction sensor, it has reduced component number and does not require high precision of the gear. For instance, in the example shown in FIG. 3, the device for determining steering wheel rotation information is based on the relationship between the distance of movement of the rack and the expansion and contraction of the elastic element, so compared to the conventional GMR-based direction sensor, the whole device has a reduced cost and can be easily installed. Other examples also have one or more of the advantages of easy installation, reduced cost and high precision as compared to the conventional GMR-based direction sensor.

In addition, in the above examples of the present invention, the linear motion transforming element is formed by a gear, a rack and a rack carrier, and in some examples, the gear is connected to the steering column through a universal joint. However, the linear motion transforming element can also be in other forms, for example, it can be formed by a turbine and a worm, and a worm carrier as well according to the need. Wherein, the turbine is connected to the steering column in an appropriate manner, for example, the turbine then drives the worm to move, and the worm is connected to the wheel in such a manner as to deliver the rotation of the turbine to the wheel. Other structures that are not described herein but can transform rotation into linear movement may also be used in the technical solution of the present invention.

Although specific embodiments of the present invention have been disclosed in the above text in conjunction with the figures, those skilled in the art can understand that the disclosed specific embodiments can be altered or modified without departing from the spirit of the present invention. The embodiments of the present invention are only for illustrating instead of limiting the invention.

What is claimed is:

1. A device for determining steering wheel rotation information, which comprises:
    a linear motion transforming element connected to a steering column of a steering wheel for transforming rotation of the steering wheel into a linear movement, the linear motion transforming element including
        a gear connected to the steering column,
        a rack engaged with the gear, wherein the steering column is configured to be driven to rotate by the steering wheel to make the gear connected to said steering column rotate, and rotation of the gear is configured to drive the rack engaged therewith to move along a rack length direction relative to an engagement origin, and
        a rack carrier for carrying the rack, the rack being disposed on said rack carrier in such a manner as to enable movement of the rack relative to the rack carrier along the rack length direction; and
    a processing element electrically connected to the linear motion transforming element for determining the steering wheel rotation information based on the linear movement transformed by the motion transforming element, wherein the processing element determines steering wheel rotation information based on a distance of movement and a direction of movement of the rack relative to the engagement origin along the rack length direction, said engagement origin being a position of engagement between the rack and the gear when the rotation angle of the steering wheel is 0 degree.

2. The device for determining steering wheel rotation information according to claim 1, wherein the processing element comprises:
    a sensing unit for sensing a distance of movement and a direction of movement of the rack relative to the engagement origin; and
    a calculating unit electrically connected to the sensing unit for determining, according to the result of sensing of the sensing unit, the distance of movement and the direction of movement, and determining the steering wheel rotation information thereby.

3. The device for determining steering wheel rotation information according to claim 2, wherein the sensing unit comprises an elastic element whose elastic end is connected to the rack in a manner of expanding and contracting with the movement of the rack, and a pressure sensor which is combined with the elastic element in such a manner as to sense an elastic force of the elastic element.

4. The device for determining steering wheel rotation information according to claim 3, wherein the calculating unit is electrically connected to the pressure sensor, the pressure sensor senses a force generated by the elastic element owing to an expansion or an extraction, and conveys a signal representing said force to the calculating unit, and the calculating unit determines, according to said force, the distance of movement and the direction of movement of the rack relative to the engagement origin.

5. The device for determining steering wheel rotation information according to claim 2, wherein the sensing unit comprises:
    a measuring gear engaged with the rack; and
    a gear rotation sensing element for sensing a number and a direction of rotation of the measuring gear caused by movement of the rack.

6. The device for determining steering wheel rotation information according to claim 5, wherein the calculating unit determines a distance of movement and a direction of movement of the rack relative to the engagement origin along the rack length direction according to the rotation number and rotation direction of the gear.

7. The device for determining steering wheel rotation information according to claim 2, wherein the sensing unit is a slide rheostat, whose coil assembly or slider is fixed on the device for determining steering wheel rotation information, when the coil assembly is fixed on the device for determining steering wheel rotation information, the slider is connected to the rack and movement of the rack drives the slider to move; when the slider is fixed on the device for determining steering wheel rotation information, the coil assembly is connected to the rack, and movement of the rack drives the coil assembly to move.

8. The device for determining steering wheel rotation information according to claim 7, wherein the calculating unit determines a distance of movement and a direction of movement of the rack relative to the engagement origin along the rack length direction according to an output of the slide rheostat.

9. The device for determining steering wheel rotation information according to claim 2, wherein the sensing unit is a capacitive grating displacement sensor, which comprises:
    a scale arranged to be fixed;
    a slide scale connected to the rack in such a manner as to move along with the rack as the rack moves;
    a transmission pole piece disposed on the scale;
    a receiving pole piece disposed on the slide scale; and
    wherein the transmission pole piece and the receiving pole piece form a capacitor, and when the slide scale is driven to move by the rack, the transmission pole and the receiving pole piece move relative to each other so that a capacitance therebetween changes.

10. The device for determining steering wheel rotation information according to claim 9, wherein the calculating unit determines a distance of movement and a direction of movement of the rack relative to the engagement origin along the rack length direction according to the change of capacitance.

11. The device for determining steering wheel rotation information according to claim 2, wherein the sensing unit is a grating displacement sensor which comprises:
    a first grating arranged to be fixed;
    a second grating connected to the rack in such a manner as to move as the rack moves;
    a light source;
    a light sensitive element; and
    wherein the first grating and the second grating are disposed between the light source and the light sensitive element, and the light source and the light sensitive element move together with the second grating when the second grating moves.

12. The device for determining steering wheel rotation information according to claim 11, wherein the calculating unit determines a distance of movement and a direction of movement of the rack relative to the engagement origin along the rack length direction according to an output of the light sensitive element.

13. The device for determining steering wheel rotation information according to claim 2, wherein the sensing unit comprises:
   a Hall sensing element disposed in said device for determining steering wheel rotation information in a fixed manner; and
   a Hall scale connected to the rack so as to move when the rack moves.

14. The device for determining steering wheel rotation information according to claim 13, wherein the calculating unit determines a distance of movement and a direction of movement of the rack relative to the engagement origin along the rack length direction according to a change of magnetic field caused by movement of the Hall scale relative to the Hall sensing element.

15. The device for determining steering wheel rotation information according to claim 1, wherein the gear is connected to the steering column through an intermediate shaft, and the intermediate shaft is connected to the steering column through a universal joint.

16. The device for determining steering wheel rotation information according to claim 1, wherein the linear motion transforming element consists of a turbine and a worm.

17. A method for determining steering wheel rotation information, which comprises:
   a) providing a linear motion transforming element at an end of a steering column that is not connected to a steering wheel so as to transform rotation of the steering wheel into a linear movement, wherein the step of providing the linear motion transforming element includes providing a gear at the end of the steering column that is not connected to the steering wheel, and providing a rack engaged with the gear, wherein the method includes driving the steering column to rotate by the steering wheel to make the gear connected to said steering column rotate, and rotation of the gear drives the rack engaged therewith to move relative to the engagement origin along a rack length direction; and
   b) determining steering wheel rotation information based on the linear movement transformed by the motion transforming element, wherein the step of determining steering wheel rotation information includes determining steering wheel rotation information based on a distance of movement and a direction of movement of the rack relative to the engagement origin along the rack length direction, said engagement origin being a position of engagement between the rack and the gear when the rotation angle of the steering wheel is 0 degree.

18. An automobile comprising:
a device for determining steering wheel rotation information, the device including
a linear motion transforming element connected to a steering column of a steering wheel for transforming rotation of the steering wheel into a linear movement, the linear motion transforming element including
   a gear connected to the steering column,
   a rack engaged with the gear, wherein the steering column is configured to be driven to rotate by the steering wheel to make the gear connected to said steering column rotate, and rotation of the gear is configured to drive the rack engaged therewith to move along a rack length direction relative to an engagement origin, and
   a rack carrier for carrying the rack, the rack being disposed on said rack carrier in such a manner as to enable movement of the rack relative to the rack carrier along the rack length direction; and
a processing element electrically connected to the linear motion transforming element for determining the steering wheel rotation information based on the linear movement transformed by the motion transforming element, wherein the processing element determines steering wheel rotation information based on a distance of movement and a direction of movement of the rack relative to the engagement origin along the rack length direction, said engagement origin being a position of engagement between the rack and the gear when the rotation angle of the steering wheel is 0 degree.

\* \* \* \* \*